United States Patent [19]

Fujikawa et al.

[11] Patent Number: 4,609,262

[45] Date of Patent: Sep. 2, 1986

[54] ASPHERICAL LENS FOR USE IN OPTICAL EQUIPMENT

[75] Inventors: Taketoshi Fujikawa; Kazuhiro Kozuka, both of Aichi, Japan

[73] Assignee: Kabushiki Kaisha Toyota Chuo Kenkyusho, Aichi, Japan

[21] Appl. No.: 681,558

[22] Filed: Dec. 14, 1984

[30] Foreign Application Priority Data

Dec. 16, 1983 [JP] Japan ............... 58-237447

[51] Int. Cl.[4] .................. G02B 3/04; G02B 13/18
[52] U.S. Cl. ........................ 350/432; 350/451
[58] Field of Search .................. 350/432–435, 350/415, 451

[56] References Cited

U.S. PATENT DOCUMENTS

| | | | |
|---|---|---|---|
| 1,422,307 | 7/1922 | Salto | 350/432 X |
| 2,063,178 | 12/1936 | Merte | 350/432 |
| 3,508,811 | 4/1970 | Yoshida | 350/432 |
| 3,598,477 | 8/1971 | Levin | 350/432 |

Primary Examiner—John K. Corbin
Assistant Examiner—Scott J. Sugarman
Attorney, Agent, or Firm—Finnegan, Henderson, Farabow, Garrett & Dunner

[57] ABSTRACT

An aspherical lens for use in optical equipment is made of a transparent lens material and rotationally symmetrical around a Z-axis of an XYZ three-dimensional coordinate system. The aspherical lens has a surface on which incident light falls and another surface from which light emerges. Either one of the surfaces comprises a spherical surface and the other surfaces comprises an aspherical surface to allow a lens to singly diverge and converge parallel rays of light. The coordinates in three-dimensional coordinate system of points on the spherical and aspherical surfaces are given using as parameters an angle ($-90° \leq \theta \leq 90°$) formed in a plane containing the Z-axis and normal to an X-Y plane and between the Z-axis and a line connecting the point and the origin of the coordinate system, and an angle ($0° \leq \phi \leq 180°$) formed in a plane parallel to the X-Y plane and between an X-axis and a line connecting the point and the Z-axis.

5 Claims, 11 Drawing Figures

ASPHERICAL LENS FOR USE IN OPTICAL EQUIPMENT

BACKGROUND OF THE INVENTION

1. Field of the Invention

The present invention relates to an aspherical lens which is singly capable of diverging and converging parallel rays of light.

2. Description of the Prior Art

Optical devices for converging parallel rays of light for heating or machining and optical devices for diverging a thin beam of light such as a laser beam have heretofore employed an optical system composed of a plurality of lenses combined together.

Figure 1:
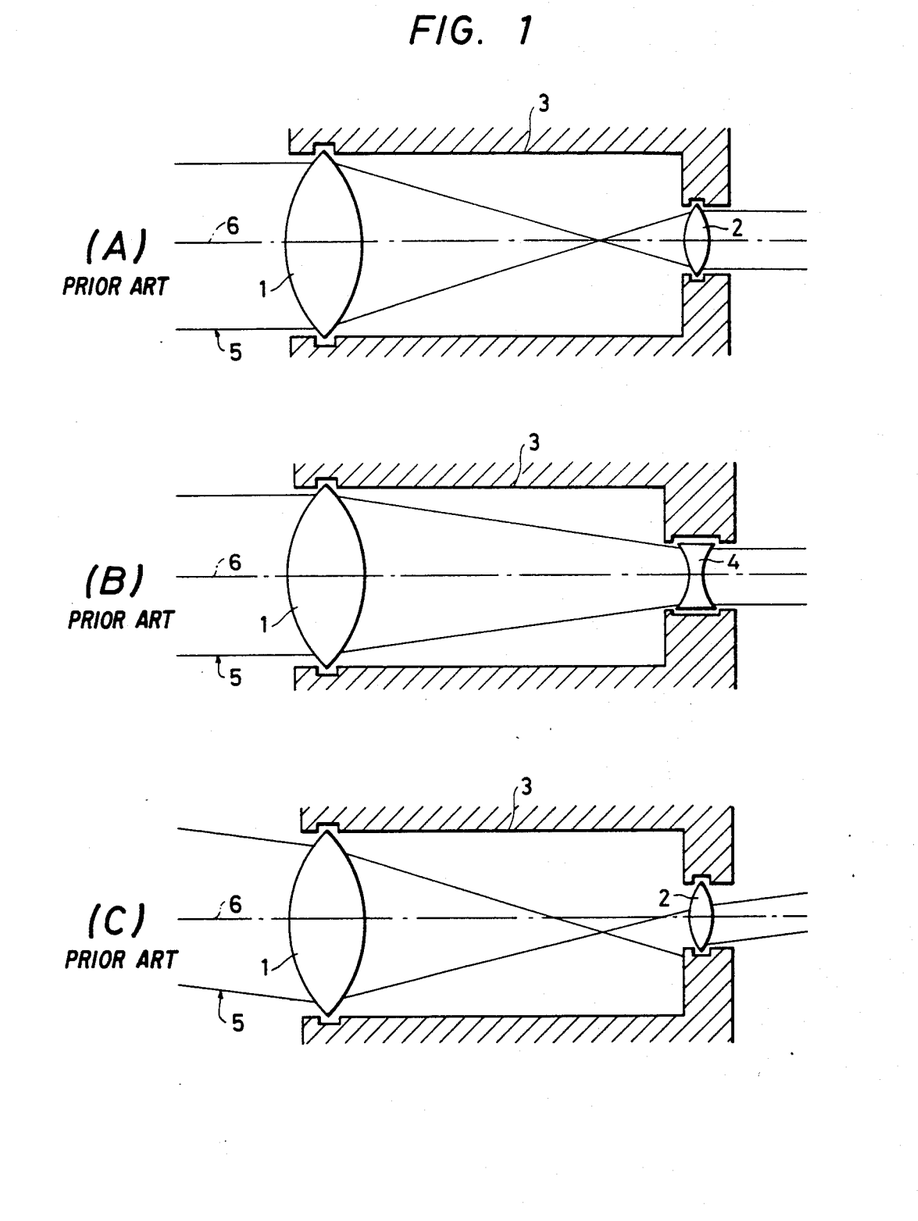
FIGS. 1(A), 1(B), and 1(C) are cross-sectional views of combined lenses in conventional optical devices.

FIG. 1(A) of the accompanying drawings illustrates an optical system comprising convex lenses 1, 2 arranged on one central axis and fixedly mounted in a lens housing 3. FIG. 1(B) shows an optical system composed of a convex lens 1 and a concave lens 4 disposed coaxially to each other and fixedly mounted in a lens housing 3. The illustrated optical devices are required to construct the lens housings 3 and assemble the lenses 1, 2, 4 into the lens housings 3 with a high accuracy in order to maintain desired parallelism and concentricity beteen the lenses 1, 2 or the lenses 1, 4. In optical systems using spherical lenses, it is widely practiced to reduce lens aberrations by increasing the number of lenses employed. With such a practice, however, higher accuracy is needed in constructing a lens housing and assembling lenses into the lens housing. Furthermore, since the optical device itself becomes heavy and large in size, any apparatus such as a heating apparatus in which the optical device is incorporated cannot be reduced in physical size. In addition, the loss of light is increased due to reflection on the surfaces of the lenses.

Optical devices may suffer from another problem even if they are constructed with high accuracy. For example, where an incident beam of light 5 as shown in FIG. 1(C) does not coincide with an optical axis 6 of the lens system, a portion of incident light will be trapped in a lens housing 3. With the conventional devices composed of combined lenses, therefore, optical axis adjustment is required to be carried out with considerable care in order to diverge or converge the light efficiently.

As described above, the prior devices for diverging or converging light beams have several problems which essentially accompany optical devices composed of combined lenses. However, a sole lens capable of diverging and converging a beam of light in the same manner as the prior optical devices would not be subjected to the foregoing problems.

Therefore, there has been a demand for a single lens which can diverge and converge a beam of light.

SUMMARY OF THE INVENTION

It is an object of the present invention to provide an aspherical lens which is singly capable of diverging and converging parallel rays of light.

Another object of the present invention is to provide a lens which has a spherical surface as either a lens surface on which incident light falls or a lens surface from which light emerges.

To achieve the above objects, there is provided an aspherical lens for optical equipment, made of a transparent lens material and rotationally symmetrical around one axis of a three-dimensional coordinate system, the aspherical lens having a spherical and an aspherical surface along said one axis and the distance along each path of light between said spherical and aspherical surfaces is so determined that an incident angle of a light ray, parallel to the one axis at an incident point, on one of the spherical and aspherical surfaces becomes equal to an emergent angle of said light ray at an emergent point on the other of the surfaces, thereby diverging or converging parallel rays of light with a single lens. When an XYZ three-dimensional coordinate system is used, the aspherical lens is rotationally symmetrical around a Z-axis, and has a surface on which incident light falls and another surface from which light emerges, one of the surfaces comprising a spherical surface given by the following equations (1) and the other surface comprising an aspherical surface given by the following equations (2):

(1) the coordinates $(x_1, y_1, z_1)$ in the XYZ three-dimensional coordinate system of a point on the spherical surface being expressed by:

$$x_1 = r_0 \sin\theta \cos\phi$$

$$y_1 = r_0 \sin\theta \sin\phi$$

$$z_1 = r_0 \cos\theta$$

where $r_0$ is the radius of curvature of the spherical surface, $\theta$ is the angle $(-90° \leq \theta \leq 90°)$ formed in a plane containing the Z-axis and normal to an X-Y plane and between the Z-axis and a line connecting the origin of the coordinate system and the point on the spherical surface, and $\phi$ is the angle $(0° \leq \phi \leq 180°)$ formed in a plane parallel to the X-Y plane and between an X-axis and a line connecting said point and the Z-axis; and (2) the coordinates $(x_2, y_2, z_2)$ in the XYZ three-dimensional coordinate system of a point on the aspherical surface being expressed by:

$$x_2 = (r_0 \sin\theta \pm \delta \sin\theta_x)\cos\phi$$
$$y_2 = (r_0 \sin\theta \pm \delta \sin\theta_x)\sin\phi$$
$$z_2 = r_0 \cos\theta \pm \delta \cos\theta_x$$

$$\delta = \delta_0 \frac{n\lambda - 1}{n\lambda - \cos\theta_x}$$

$$\theta_x = \theta - \sin^{-1}\left(\frac{1}{n\lambda} \sin\theta\right)$$

where $\theta_x$ is the angle at which light incident parallel to the Z-axis is refracted by the lens surface, $\delta$ is the thickness of the lens along a path therein of light incident parallel to the Z-axis and refracted by the lens surface, $\delta_0$ is the thickness of the lens on the Z-axis, and $n\lambda$ is the refractive index of the lens material with respect to light having a wavelength $\lambda$.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

The principles of the structure of aspherical lens according to the present invention will be described.

Figure 2:
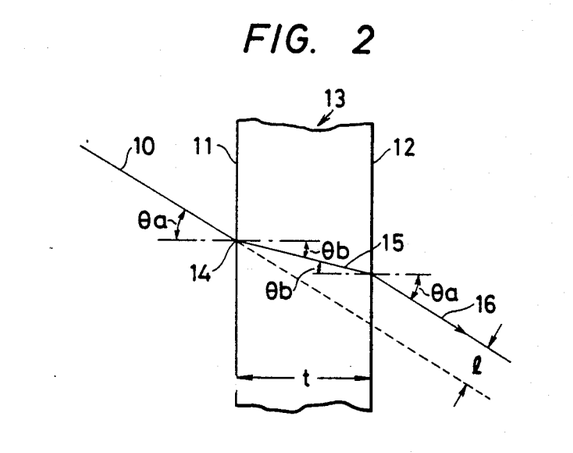
FIGS. 2 through 4 are diagrams explanatory of the principles of a lens according to the present invention.

FIG. 2 is illustrative of a light path in which a ray of light 10 having a wavelength $\lambda$ enters a plate of glass 13 made of optical glass having a refractive index n$\lambda$ with respect to the light 10 and having a surface 11 on which the incident light falls and a surface 12 from which the light emerges the surfaces 11, 12 being parallel to each other. When the incident light 10 is refracted by the surface 11 of the glass plate 13, the following equation (1) is met:

$$\sin \theta_a / \sin \theta_b = n\lambda \quad (1)$$

where $\theta_a$ is the angle of incidence in a point 14 at which the light 10 strikes the surface 11 of the glass plate 13, and $\theta_b$ is the angle of refraction in the point 14 at which the light 10 enters the glass plate 13.

The incident light 10 as it is refracted passes through a path 15 in the glass plate 13, and is refracted again by the surface 12 and emerges as emergent light 16. The emergent light 16 emerges from the surface 12 parallel to the incident light 10. As a result, the emergent light 16 is deviated from an extension of the incident light 10 by a distance l. The distance l is given by the following equation (2):

$$l = t \cos \theta_a (\tan \theta_a - \tan \theta_b) \quad (2)$$

where t is the thickness of the glass plate 13. Where the refractive index n$\lambda$ is constant, the distance l is a function of the incident angle $\theta_a$ and the thickness t of the glass plate 13.

Figure 3:
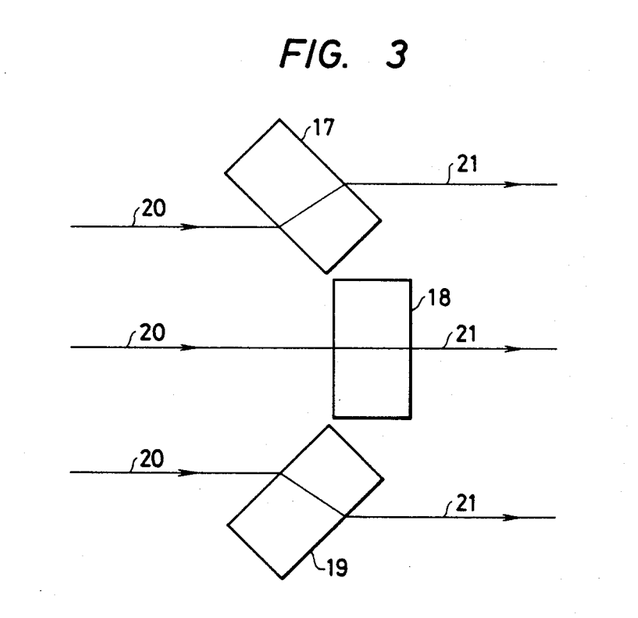

FIG. 3 shows an arrangement in which three glass plates 17, 18, 19, which are identical to the glass plate 13, are inclined at different angles to the optical axes of parallel rays of light, and three parallel rays of light 20 are caused to fall on the glass plates 17, 18, 19. As can be understood from FIG. 3, emergent rays of light 21 from the glass plates 17, 18, 19 are parallel to the incident rays of light 20, but the incident angles of the glass plates 17, 18, 19 are different from each other. Therefore, where incident light comes from a lefthand light source, as illustrated, the emergent rays 21 are spaced from each other by larger distances than those at which the incident rays 20 are spaced from each other. With the glass plates 17, 18, 19 arranged as shown in FIG. 3, where incident light has come from a righthand light source, the light rays are reversed in their direction, and the emergent rays are spaced from each other by smaller distances than those at which the incident rays are spaced from each other. It follows therefore that incident light rays could be converged and diverged by continuously increasing and reducing the distances between the parallel rays of light.

Now, a lens construction will be considered in which either one of lens surfaces is spherical and the distances between light rays are increased and reduced two-dimensionally in any cross sectional plane passing through the center of the spherical surface. One of the lens surfaces is made spherical since the lens can be manufactured easily.

Figure 4:
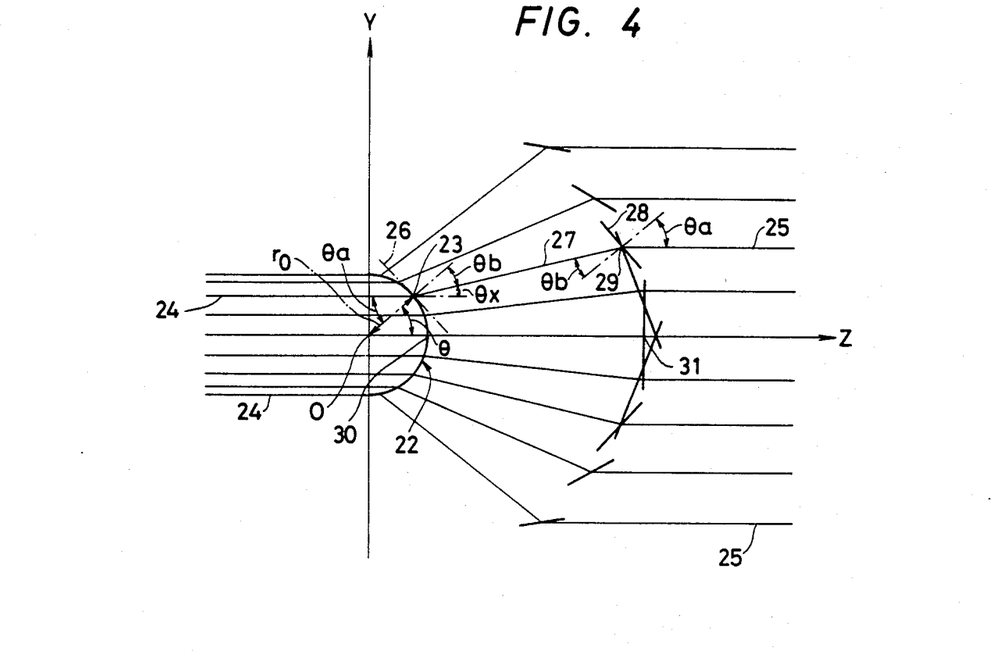

The spherical surface is defined rotationally symmetrically about a Z-axis in an XYZ three-dimensional coordinate system. FIG. 4 shows a Y-Z plane in the XYZ three-dimensional coordinate system, in which the spherical surface is indicated as a semicircular arc 22 having a center of curvature 0 identical to the origin of the coordinate system and a radius of curvature $r_0$. The coordinates (Z, Y) of a point 23 on the arc 22 are expressed, using as a parameter an angle $\theta$ formed between the Z-axis and a line connecting the point 23 on the arc 22 and the origin 0 ($-90° \leq \theta \leq 90°$), as follows:

$$Z = r_0 \cos \theta \quad (3)$$

$$Y = r_0 \sin \theta \quad (4)$$

Let it be assumed that an incident ray of light 24 parallel to the Z-axis enters the lens through the point 23, passes through the lens, and then emerges from the lens as an emergent ray 25 parallel to the Z-axis. The angle of incidence $\theta_a$ of the light ray 24 on the lens can easily be determined by drawing a line 26 tangential to the arc 22 at the point 23, and finding the angle between the tangential line 26 and the Z-axis. A path 27 which the incident ray 24 follows in the lens after having been refracted at the point 23 can be calculated simply by finding $\theta_b$ according to the equation (1). Then, a line 28 crossing the path 27 and parallel to the tangential line 26 is drawn, and it is assumed that the ray passing along the path 27 in the lens emerges from the lens at a point 29 where the line 28 crosses the path 27. Now, the emergent ray 25 leaving the lens at the point 29 is parallel to the Z-axis. By processing a plurality of incident rays 24 parallel to the Z-axis in the foregoing manner, the distances between emergent rays 25 can be made larger than those between the incident rays 24 while permitting the emergent rays 25 to be kept parallel to the Z-axis as shown in FIG. 4.

For continuously achieving the same effect on all incident rays 24 parallel to the Z-axis, a line should be drawn in enveloping relation to lines 28 drawn parallel to lines 26 tangential to the arc 22. In order for the lens to be effective as a lens for optical equipment, the thickness $\delta$ of the lens (the distance between the points 23, 29) along paths of light must be varied with the angle $\theta$ so that all of the optical path length passing through all points in the lens will be equal to each other. Assuming that the lens thickness between a point 30 where $\theta = 0$ or a light ray passes along the Z-axis and a point 31 from which the light ray emerges is indicated by $\delta_0$, the lens thickness $\delta$ along the path 27 in the lens can be given by the following equations (5) and (6):

$$\delta = \delta_0 \frac{n\lambda - 1}{n\lambda - \cos\theta_x} \quad (5)$$

-continued $$\theta_x = \theta - \sin^{-1}\left(\frac{1}{n\lambda}\sin\theta\right) \quad (6)$$

where $\theta_x$ is the angle at which the ray 24 incident on the lens parallel to the Z-axis is refracted by the lens surface 22.

Figure 5:
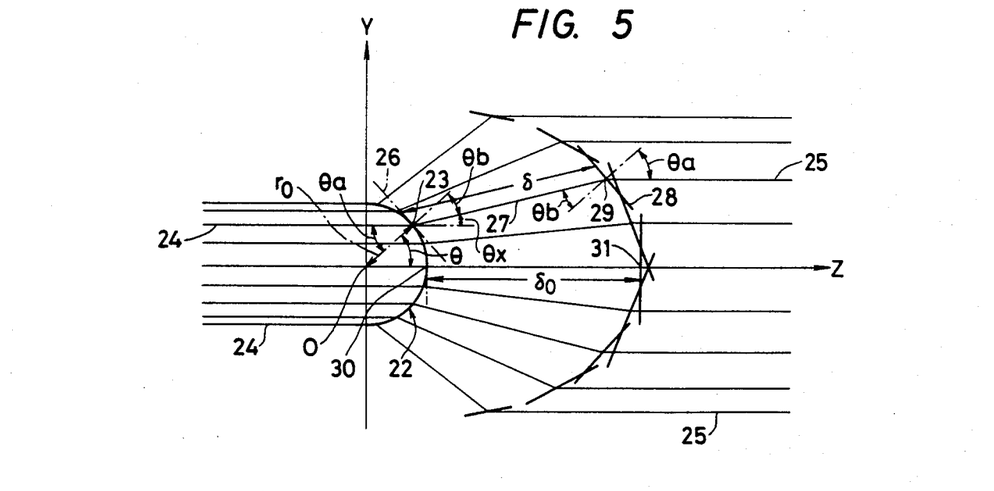
FIG. 5 is a diagram illustrative of the principles of the lens of the invention.
Figure 6:
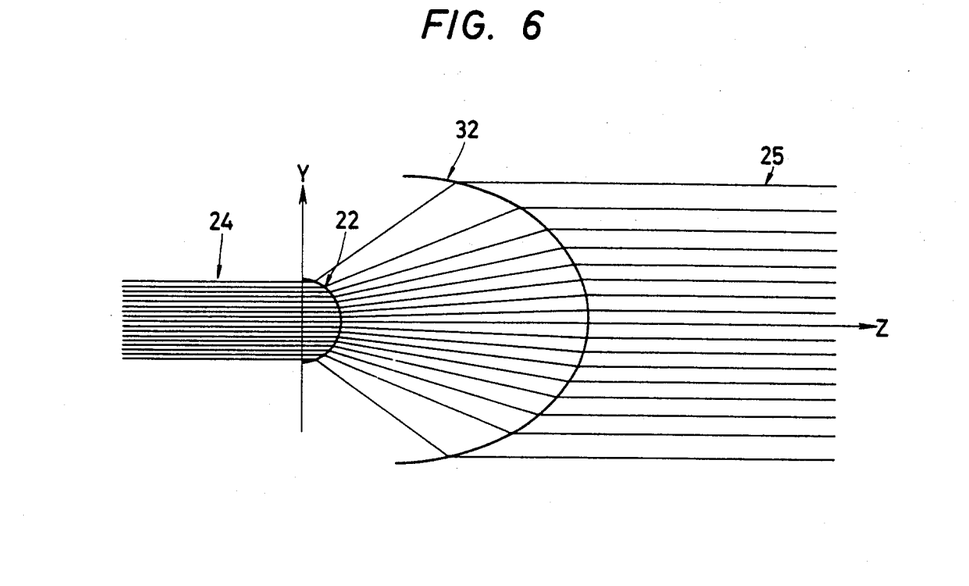
FIGS. 6 and 7 are cross-sectional views of lenses according to embodiments of the invention, which have inner and outer spherical surfaces, respectively, the views also showing paths of rays of light.
Figure 7:
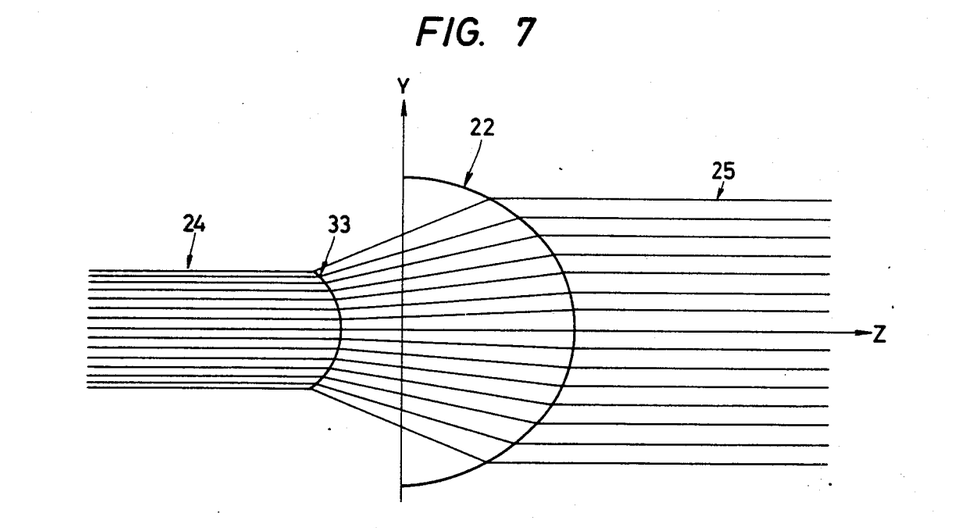

FIG. 5 is illustrative of a lens arrangement in which the lens thickness $\delta$ of FIG. 4 is corrected. The lens with a surface on which incident light falls being defined by an arc given by the equations (3) and (4) in FIG. 4 has a surface from which the light emerges and which is indicated by a curve given as a line enveloping the group of lines 28. The coordinates (Z, Y) of the envelope is given by the following equations (7) and (8):

$$Z = r_0 \cos\theta \pm \delta \cos\theta_x \quad (7)$$

$$Y = r_0 \sin\theta \pm \delta \sin\theta_x \quad (8)$$

and the envelope is shaped as a line 32 in FIG. 6 and a line 33 in FIG. 7.

By rotating the arc 22 given by the equations (3) and (4) and the envelopes 32, 33 given by the equations (7) and (8) about the Z-axis, both surfaces of desired aspherical lenses can be determined.

The positive sign is used in the equations (7) and (8) when the inner surface of the lens is to be formed as a spherical surface given by the arc 22 (as shown in FIG. 6), and the negative sign is used in the equations (7) and (8) when the outer surface of the lens is to be formed as a spherical surface given by the arc 22 (as shown in FIG. 7).

Now, the arcs given by the equations (3) and (4) and the curves given by the equations (7) and (8) are rotated about the Z-axis, and the isordinates of the formed lens surfaces are determined. Assuming that angle of rotation of the point 23 on the arc 22 and of the point 29 on the curve 32 or 33 about the Z-axis is given as $\psi$ ($0° \leq \psi \leq 108°$), the coordinates (X, Y, Z) of the point on the spherical lens surface are expressed by:

$$X = r_0 \sin\theta \cos\phi \quad (9)$$

$$Y = r_0 \sin\theta \sin\phi \quad (10)$$

$$Z = r_0 \cos\theta \quad (11)$$

and the coordinates (X, Y, Z) of the point on the aspherical surface are given by:

$$X = (r_0 \sin\theta \pm \delta \sin\theta_x)\cos\phi \quad (12)$$

$$Y = (r_0 \sin\theta \pm \delta \sin\theta_x)\sin\phi \quad (13)$$

$$Z = r_0 \cos\theta \pm \delta \cos\theta_x \quad (14)$$

$$\delta = \delta_0 \frac{n\lambda - 1}{n\lambda - \cos\theta_x} \quad (15)$$

$$\theta_x = \theta - \sin^{-1}\left(\frac{1}{n\lambda}\sin\theta\right) \quad (16)$$

where the angles $\theta$, $\phi$ are parameters ($-90° \leq \theta \leq 90°$, $0° \leq \phi \leq 180°$). The positive sign is used in the equations (12) and (13) when the spherical lens surface is located inwardly of the other aspherical lens surface, and the negative sign is used in the equations (12), (13) and (14) when the spherical lens surface is located outwardly of the other aspherical lens surface.

Accordingly, there is provided an aspherical lens made of a transparent optical material and having a lens surface on which incident light falls and a lens surface from which light emerges, one of the lens surfaces being spherical while the other is aspherical, the surfaces being expressed in an XYZ three-dimensional coordinate system in which an X-axis, a Y-axis, or any straight line lying in an X-Y plane and passing through the origin of the coordinate system, is employed as a basic line, the spherical surface being drawn such that the coordinates ($x_1$, $y_1$, $z_1$) of a point on the spherical surface meet the following equations:

$$x_1 = r_0 \sin\theta \cos\phi \quad (17)$$

$$y_1 = r_0 \sin\theta \sin\phi \quad (18)$$

$$z_1 = r_0 \cos\theta \quad (19)$$

and the aspherical surface being drawn such that coordinates ($x_2$, $y_2$, $z_2$) of a point on the aspherical surface meet the following equations:

$$x_2 = (r_0 \sin\theta \pm \delta \sin\theta_x)\cos\phi \quad (20)$$

$$y_2 = (r_0 \sin\theta \pm \delta \sin\theta_x)\sin\phi \quad (21)$$

$$z_2 = r_0 \cos\theta \pm \delta \cos\theta_x \quad (22)$$

$$\delta = \delta_0 \frac{n\lambda - 1}{n\lambda - \cos\theta_x} \quad (23)$$

$$\theta_x = \theta - \sin^{-1}\left(\frac{1}{n\lambda}\sin\theta\right) \quad (24)$$

where the angles $\theta$, $\phi$ meet the ranges $-90° \leq \theta \leq 90°$, $0° \leq \phi \leq 180°$). By thus determining the lens surfaces, the aspherical lens is singly capable of diverging and converging parallel rays of light.

Figure 8:
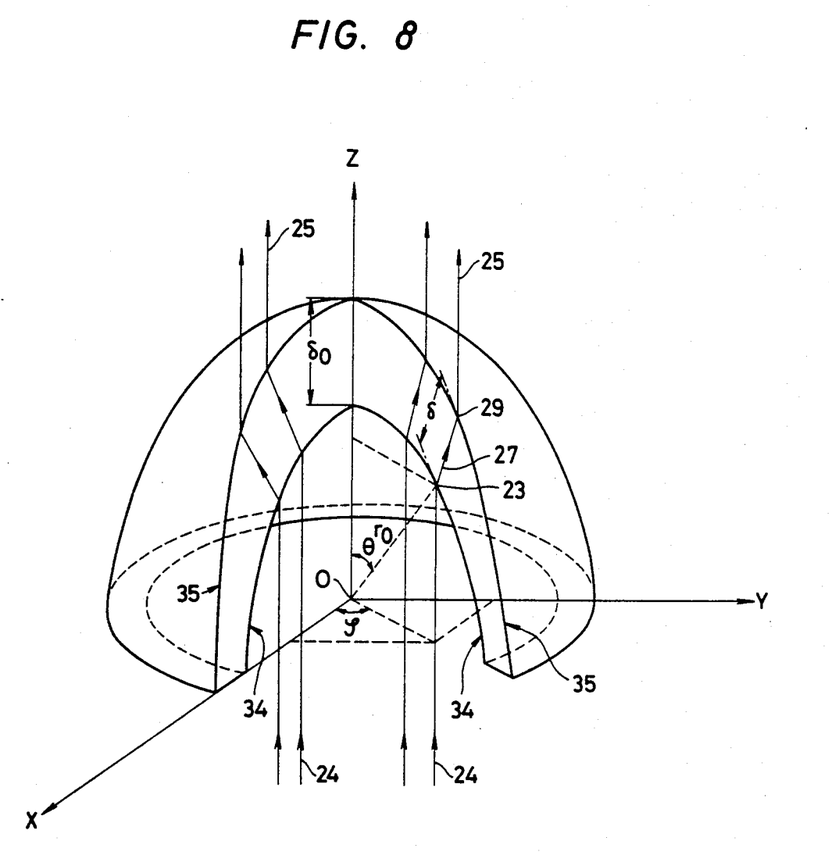
FIG. 8 is a perspective view, partly cut away, of a lens according to an embodiment of the present invention.

FIG. 8 is illustrative of an aspherical lens according to the present invention, the lens having an inner spherical surface 34 given by the coordinates ($x_1$, $y_1$, $z_1$) according to the equations (17) through (19) and an outer aspherical surface 35 given by the coordinates ($x_2$, $y_2$, $z_2$) according to the equations (20) through (24). With the aspherical lens of the above construction, as is apparent from the description with reference to FIGS. 4 and 5, a light ray 24 parallel to the Z-axis enters the lens through a point 23 on the semispherical surface 34, is refracted to pass along a line 27 in the lens, and emerges from the lens through a point 29 on the aspherical surface 35 parallel to the Z-axis. It is evident that the emergent rays 25 are spaced more widely than the incident rays 24 are spaced.

Figure 9:
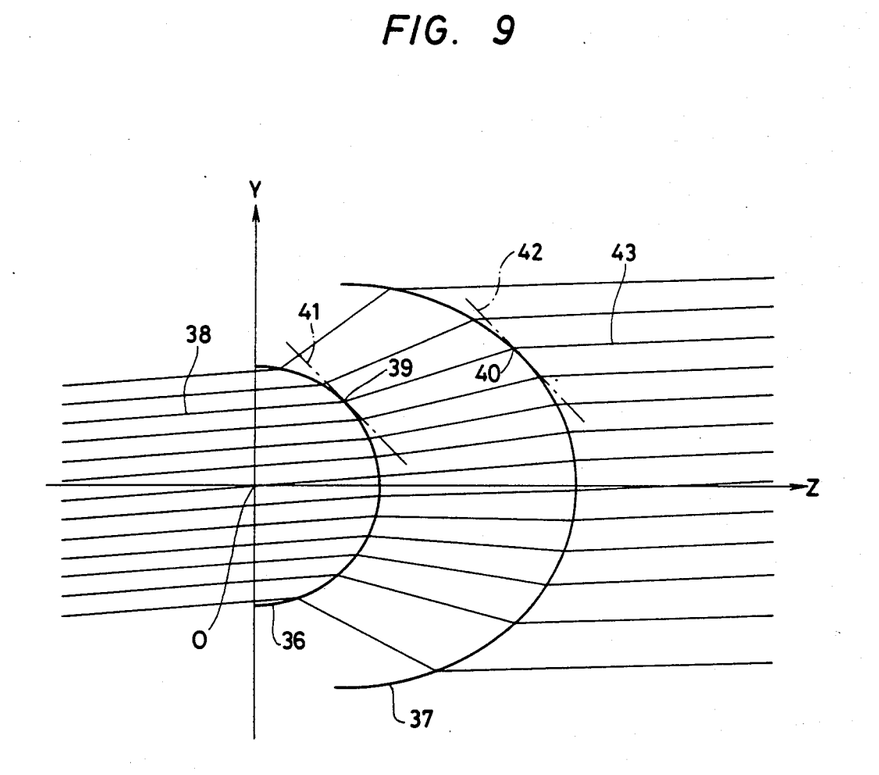
FIG. 9 is a diagram illustrating a specific example of use of a lens according to the present invention.

FIG. 9 shows an aspherical lens according to another embodiment, the lens being shown in cross section within the Y-Z plane. The aspherical lens has an inner spherical surface 36 given by the equations (17) through (19) and an outer aspherical surface 37 given by the equations (20) through (24). FIG. 9 is also illustrative of paths of parallel rays of light 38 incident on the lens along an optical axis inclined to the Z-axis. A light ray 38 is incident on the lens at a point 39 on the spherical surface 36, and emerges from the lens 40 through a point 40 on the aspherical surface 37. Lines 41, 42 are drawn tangentially to the spherical and aspherical surfaces 36, 37, respectively, at the points 39, 40, and the tangential lines 41, 42 cross each other at an angle proportional to the angle at which the incident ray 38 is inclined to the Z-axis, while the tangential lines 26, 28 remain parallel in FIG. 5 where the incident ray is parallel to the Z-axis. Therefore, an emergent ray 43 emerging from the lens through the point 40 is not parallel to the incident ray 38. However, since the angles formed by tangential lines drawn at points on the spherical and aspherical surfaces 36, 37 are equalized for each of the parallel incident rays 38, the emergent rays 43 remain parallel to each other except the lens aberration in the periphery of the lens. Furthermore, all of the incident rays are effectively diverged. If the light is reversed in direction in FIG. 9, then emergent rays are parallel and spaced from each other at distances smaller than those at which incident rays are spaced.

Accordingly, the lens of the invention is singly capable of efficiently diverging and converging parallel rays of light.

With the arrangement of the invention, a lens has a surface on which incident rays of light fall and a surface from which rays of light emerges, one of the surfaces comprising a spherical surface with its coordinates ($x_1$, $y_1$, $z_1$) in an XYZ three-dimensional coordinate system being given by the equations (17) through (19) referred to above and the other surface comprising an aspherical surface with its coordinates ($x_2$, $y_2$, $z_2$) in the same coordinate system being given by the equations (20) through (24) referred to above. As a consequence, the single lens can diverge or converge parallel rays of light incident thereon parallel to the Z-axis, and allows the rays to emerge as parallel rays of light.

Since a single lens of the invention can replace a combination lens system employed for diverging and converging rays of light in conventional optical equipment, the optical equipment can be rendered lighter in weight and smaller in size. The lens of the invention can easily be incorporated in smaller optical devices, and minimize a light loss due to reflection by the lens surfaces. In addition, no loss due to entrapment of light is produced even if the lens optical axis and the optical axis of incident light are slightly deviated from each other. The rays of light passing through the lens can be maintained in parallelism for allowing the lens to function sufficiently. Thus, optical axis adjustment is easily to carry out. With one of the lens surfaces being spherical, the problem experienced with grinding of at least one lens surface is eliminated.

Inasmuch as the lens housing is not required to be constructed and the lens system is not required to be assembled therein with a high degree of accuracy which has heretofore been necessitated, the number of manufacturing steps is greatly reduced and more uniform product quality can be achieved as compared with conventional combination lens systems.

Accordingly, the aspherical lens of the present invention is effective for diverging rays of light as a beam expander for a laser beam, for example, and for converging rays of light to increase the density of light rays for increasing illuminance or the density of light energy available as a heating source. Therefore, the aspherical lens of the invention is of high practical advantage.

Although a certain preferred embodiment has been shown and described, it should be understood that many changes and modifications may be made therein without departing from the scope of the appended claim.

What is claimed is:

1. A single aspherical lens having spherical surface means and aspherical surface means for receiving parallel rays of incident light in one of the surface means, diverging or converging the rays of light while the rays of light are in the lens, and emanating parallel rays of emergent light from the other surface means.

2. A single aspherical lens according to claim 1 wherein the rays of incident light and the rays of emergent light are parallel to each other.

3. An aspherical lens according to claim 1, wherein said three-dimensional coordinate systems in an XYZ three-dimensional coordinate system and said aspherical lens being rotationally symmetrical around a Z-axis, said spherical surface being given by the following equations (a) and said aspherical surface by the following equations (b):

(a) the coordinates ($x_1$, $y_1$, $z_1$) in the XYZ three dimensional coordinate system of a point on the spherical surface being expressed by:

$$x_1 = r_0 \sin\theta \cos\phi$$

$$y_1 = r_0 \sin\theta \sin\phi$$

$$z_1 = r_0 \cos\theta$$

where $r_0$ is the radius of curvature of the spherical surface, $\theta$ is the angle ($-90° \leq \theta \leq 90°$) formed in a plane containing the Z-axis and normal to an X-Y plane and between the Z-axis and a line connecting the origin of the coordinate system and at the point on the spherical surface, and $\theta$ is the angle ($0° \leq \phi \leq 180°$) formed in a plane parallel to the X-Y plane and between an X-axis and a line connecting said point and the Z-axis; and (b) the coordinates ($x_2$, $Y_2$, $z_2$) in the XYZ three-dimensional coordinate system of a point on the aspherical surface being expressed by:

$$x_2 = (r_0 \sin\theta \pm \delta \sin\theta_x)\cos\phi$$
$$y_2 = (r_0 \sin\theta \pm \delta \sin\theta_x)\sin\phi$$
$$z_2 = r_0 \cos\theta \pm \delta \cos\theta_x$$

$$\delta = 0 \frac{n\lambda - 1}{n\lambda - \cos\theta_x}$$

$$\theta_x = \theta - \sin^{-1}\left(\frac{1}{n\lambda} \sin\theta\right)$$

where $\theta_x$ is the angle at which incident light parallel to the Z-axis is refracted by the lens surface, $\delta$ is the thickness of the lens along a path therein of incident light parallel to the Z-axis and refracted by the lens surface, $\delta_0$ is the thickness of the lens on the Z-axis, and $n\lambda$ is the refractive index of the of the lens material with respect to light having a wavelength $\lambda$.

4. An aspherical lens for optical equipment, made of a transparent lens material and rotationally symmetrical around one axis of a three-dimensional coordinate system, said aspherical lens having a spherical and an aspherical surface along said one axis and the distance along each path of light between said spherical and aspherical surfaces is so determined that an incident angle of a light ray, parallel to said one axis at an incident point, on one of the spherical and aspherical surfaces becomes equal to an emergent angle of said light ray at an emergent point on the other of said surfaces, thereby diverging or converging parallel rays of incident light as emergent light rays parallel to said rays of incident light with a single lens.

5. An aspherical lens according to claim 4, wherein said three-dimensional coordinate system is an XYZ three-dimensional coordinate system and said aspherical lens being rotationally symmetrical around a Z-axis, said spherical surface being given by the following equations (a) and said aspherical surface by the following equations (b):

(a) the coordinates $(x_1, y_1, z_1)$ in the XYZ three-dimensional coordinate system of a point on the spherical surface being expressed by:

$$x_1 = r_0 \sin\theta \cos\phi$$

$$y_1 = r_0 \sin\theta \sin\phi$$

$$z_1 = r_0 \cos\theta$$

where $r_0$ is the radius of curvature of the spherical surface, $\theta$ is the angle $(-90° \leq \theta \leq 90°)$ formed in a plane containing the Z-axis and normal to an X-Y plane and between the Z-axis and a line connecting the origin of the coordinate system and the point on the spherical surface, and $\phi$ is the angle $(0° \leq \phi \leq 180°)$ formed in a plane parallel to the X-Y plane and between an X-axis and a line connecting said point and the Z-axis; and (b) the coordinates $(x_2, y_2, z_2)$ in the XYZ three-dimensional coordinate system of a point on the aspherical surface being expressed by:

$$x_2 = (r_0 \sin\theta \pm \delta \sin\theta_x)\cos\phi$$
$$y_2 = (r_0 \sin\theta \pm \delta \sin\theta_x)\sin\phi$$
$$z_2 = r_0 \cos\theta \pm \delta \cos\theta_x$$

$$\delta = \delta_0 \frac{n\lambda - 1}{n\lambda - \cos\theta_x}$$

$$\theta_x = \theta - \sin^{-1}\left(\frac{1}{n\lambda} \sin\theta\right)$$

where $\theta_x$ is the angle at which incident light parallel to the Z-axis is refracted by the lens surface, $\delta$ is the thickness of the lens along a path therein of incident light parallel to the Z-axis and refracted by the lens surface, $\delta_0$ is the thickness of the lens on the Z-axis, and $n\lambda$ is the refractive index of the lens material with respect to light having a wavelength $\lambda$.

* * * * *